(12) United States Patent
Grubel

(10) Patent No.: US 10,036,365 B2
(45) Date of Patent: Jul. 31, 2018

(54) SYSTEM AND METHOD FOR CONVERTING FLUID MOTION INTO ELECTRICAL POWER

(75) Inventor: Brian C. Grubel, Glen Burnie, MD (US)

(73) Assignee: THE BOEING COMPANY, Chicago, IL (US)

( * ) Notice: Subject to any disclaimer, the term of this patent is extended or adjusted under 35 U.S.C. 154(b) by 1271 days.

(21) Appl. No.: 13/468,640

(22) Filed: May 10, 2012

(65) Prior Publication Data

US 2013/0300122 A1 Nov. 14, 2013

(51) Int. Cl.
*F03B 13/10* (2006.01)
*F03B 13/26* (2006.01)
*F03B 17/06* (2006.01)

(52) U.S. Cl.
CPC ............ *F03B 13/264* (2013.01); *F03B 17/06* (2013.01); *F05B 2240/311* (2013.01); *F05B 2250/43* (2013.01); *Y02E 10/28* (2013.01)

(58) Field of Classification Search
CPC .......... F04B 2240/917; F04B 2240/921; F04B 2240/922; F03D 5/06
USPC ...................... 60/398; 416/54, 131
See application file for complete search history.

(56) References Cited

U.S. PATENT DOCUMENTS

| 2,414,480 A | 1/1947 | Morrill |
| 4,415,823 A | 11/1983 | Jurgens |
| 6,956,300 B2 * | 10/2005 | Gizara ............................ 290/43 |
| 2002/0033019 A1 * | 3/2002 | Mizzi .............................. 60/398 |
| 2004/0250537 A1 * | 12/2004 | Krouse ........................... 60/398 |
| 2009/0185904 A1 | 7/2009 | Landberg |

(Continued)

FOREIGN PATENT DOCUMENTS

| CA | 2622265 A1 * | 3/2007 | .............. F03D 5/06 |
| DE | 2905157 A1 * | 5/1978 | ............. F03B 17/06 |

(Continued)

OTHER PUBLICATIONS

Turbine, http://en.wikipedia.org/wiki/Turbine dated May 10, 2012, 9 pgs.

(Continued)

*Primary Examiner* — Michael Leslie
*Assistant Examiner* — Matthew Wiblin
(74) *Attorney, Agent, or Firm* — Womble Bond Dickinson (US) LLP

(57) ABSTRACT

A system is provided for converting fluid motion into electrical power, with the system being deployable in a body of fluid. The system includes a support structure and a movable structure connected to the support structure. The support structure includes a generator assembly configured to convert mechanical energy to electrical energy and provide electric power from the electrical energy. The movable structure has three or more degrees of freedom, and is configured to generate mechanical energy for conversion by the generator assembly during a power generation phase of a power cycle in which the fluid motion acts on the movable structure. The movable structure has a first configuration during the power generation phase and a second, different configuration during a recovery phase of the power cycle, with the movable structure in the first configuration having a greater surface area normal to the flow of fluid.

10 Claims, 11 Drawing Sheets

(56) References Cited

U.S. PATENT DOCUMENTS

| | | | |
|---|---|---|---|
| 2009/0212562 A1 | 8/2009 | Jaugilas | |
| 2010/0276934 A1 | 11/2010 | Francis | |
| 2010/0276941 A1 | 11/2010 | Zhang et al. | |
| 2011/0156396 A1 | 6/2011 | Cleveland | |
| 2011/0266805 A1 | 11/2011 | Landberg | |
| 2012/0086210 A1* | 4/2012 | Gray | 290/55 |

FOREIGN PATENT DOCUMENTS

| | | | | |
|---|---|---|---|---|
| DE | 29 05 157 A1 | 8/1980 | | |
| GB | 2480694 A * | 11/2011 | | F03B 13/26 |
| WO | WO2009/060154 A2 | 5/2009 | | |
| WO | WO 2009060154 A2 * | 5/2009 | | F03B 17/06 |

OTHER PUBLICATIONS

Wind turbine design, http://en.wikipedia.org/wiki/Wind_turbine_design dated May 10, 2012, 17 pgs.
Marine current power, http://en.wikipedia.org/w/index.php?title=Marine_current_power&printable=yes dated Apr. 20, 2012, 2 pgs.
Ocean Wave Power, http://www.energysavers.gov/renewable_energy/ocean/index.cfm/mytopic=50009?print dated Apr. 20, 2012, 2 pgs.
Ocean Tital Power, http://www.energysavers.gov/renewable_energy/ocean/index.cfm/mytopic=50008?print dated Apr. 20, 2012, 2 pgs.
Deep Green underwater kite to generate electricity (w/Video), http://phys.org/print192784124.html dated Apr. 20, 2012, 2 pgs.
Tidal stream generator, http://en.wikipedia.org/w/index.php?title=Tidal_stream_generator&printable=yes dated Apr. 20, 2012, 9 pgs.
SeaGen, http://en.wikipedia.org/w/index.php?title=SeaGen&printable=yes dated Apr. 20, 2012, 3 pgs.
Wind farm, http://en.wikipedia.org/w/index.php?title=Wind_farm&printable=yes dated Apr. 20, 2012, 15 pgs.
Mechanically-powered flashlight, http://en.wikipedia.org/w/index.php?title=Mechanically-powered_flashlight&printable=yes dated May 10, 2012, 5 pgs.
International Search Report and Written Opinion dated Nov. 21, 2013 for PCT/US2013/030262, 11 pages.
International Preliminary Report on Patentability dated Nov. 11, 2014 for International Application No. PCT/US2013/030262.

* cited by examiner

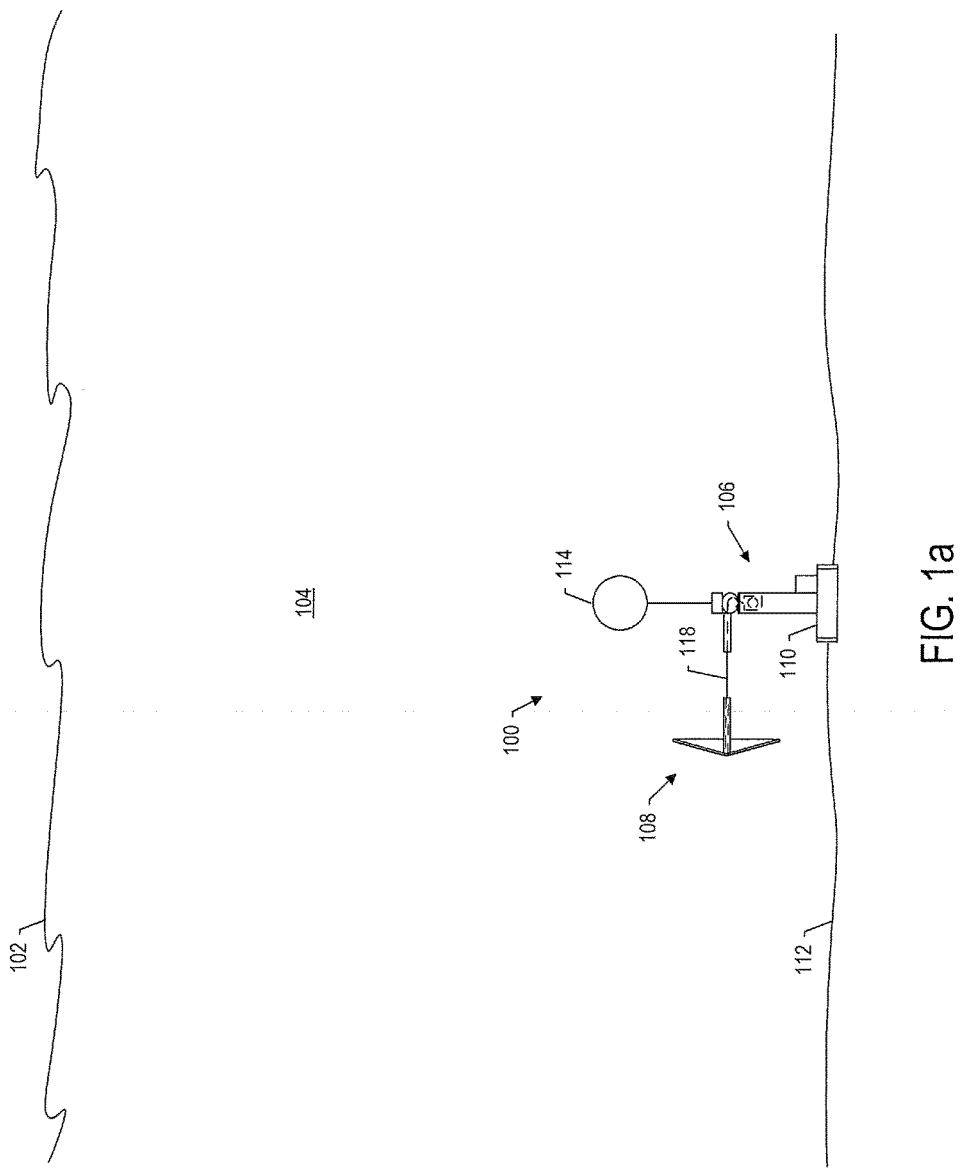

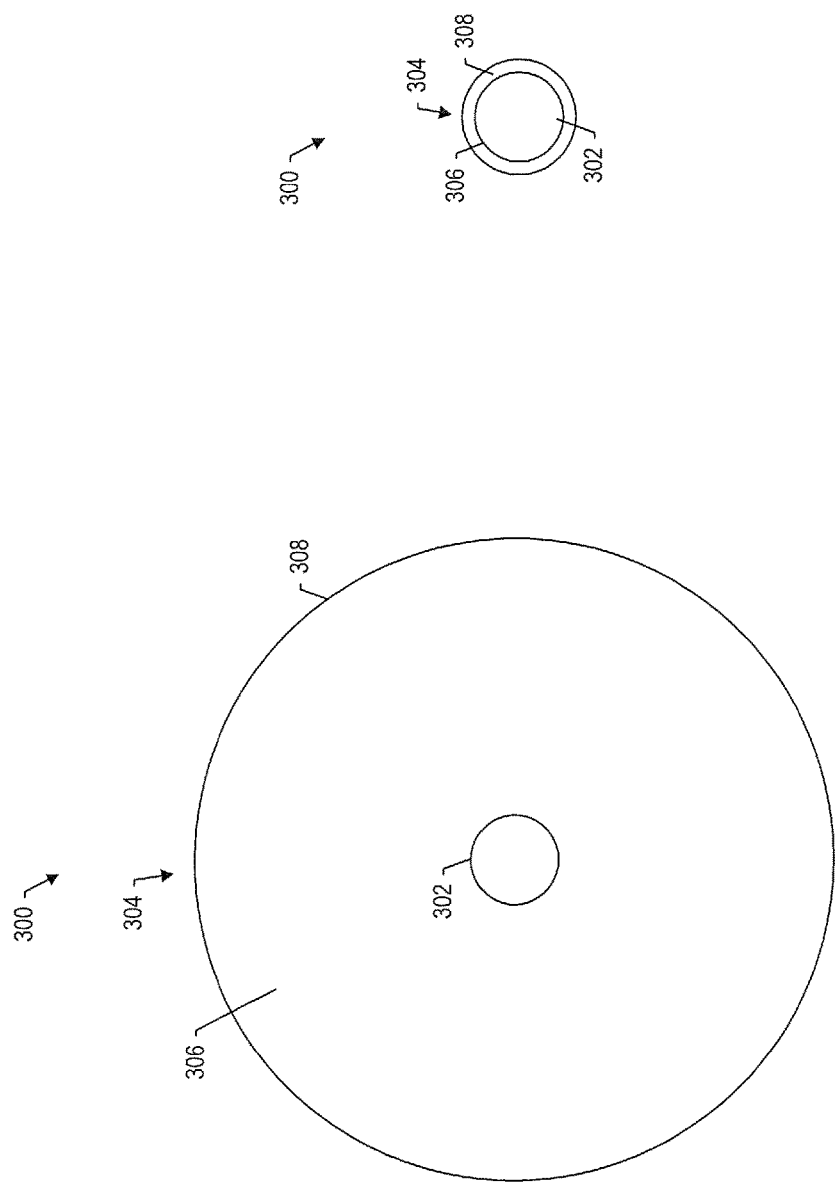

SYSTEM AND METHOD FOR CONVERTING FLUID MOTION INTO ELECTRICAL POWER

TECHNOLOGICAL FIELD

The present disclosure relates generally to converting fluid motion into electrical power and, in particular, to a system including reconfigurable movable structure that converts underwater current into electrical power.

BACKGROUND

There is a pressing need to develop clean energy sources. Since most of the surface of the earth is covered by water, water-based systems provide the most potential for energy generation due to sheer volume. The gravitational effect that causes tides provides an enormous amount of energy since the mass and force of the water is many times greater than that of any air-based system. Moving even just a few thousand cubic feet of water requires energy that would take up incredible amounts of airspace or physical land to be equaled with either wind or solar power. Therefore the tides may provide a significant amount of renewable energy to be harnessed by orders of magnitude over other renewable energy forms.

As an example, the Bay of Fundy has tidal variation of 40 feet. The energy in moving that mass of water every day is absolutely enormous. This is a naturally occurring geographic phenomenon that may be duplicated in man-made tidal zones.

Present emphasis for water-based energy production focuses on water turbines, which are analogous to wind turbines including propellers, affixed to electrical generators. Similar to wind turbines, however, water turbines require very selective placement to yield sufficient power. That is, water turbines typically require placement in areas of significant current flow. Water turbines are also often large, complex, bulky devices that are not easily deployed. Water turbines also often require an undesirable amount of time to deploy. For forward operating base (FOB) and similar applications that may benefit from water-based energy production, speed of deployment as well as the flexibility of deployment in a wide variety of situations may be significant issues.

Therefore, it would be desirable to have an system and method that takes into account at least some of the issues discussed above, as well as possibly other issues.

BRIEF SUMMARY

Examples the present disclosure are generally directed to a system and method for converting fluid motion into electrical power. Compared water turbines that typically require significant current flow, the system and method may be used in a number of current or velocity environments. In this regard, compared water turbines that typically require significant current flow, the system and method may be used in low current or other low velocity environments. Examples may further provide multiple configurations for different phases of a power cycle, and/or an increased number of degrees of freedom to account for fluid motion in different directions.

According to one example, a system is provided for converting fluid motion into electrical power, with the system being deployable in a body of fluid. The system includes a support structure and a movable structure connected to the support structure. In one example, the system is deployable underneath a surface of the body of fluid; and in this example, the support structure may be tethered to a buoy configured to hold the support structure upright when deployed. In other examples, the system may be deployable on or only partially beneath the surface of the body of fluid.

The support structure includes a generator assembly configured to convert mechanical energy to electrical energy and provide electric power from the electrical energy. The movable structure has three or more degrees of freedom, and is configured to generate mechanical energy for conversion by the generator assembly during a power generation phase of a power cycle in which the fluid motion acts on the movable structure.

The movable structure has a first configuration during the power generation phase and a second, different configuration during a recovery phase of the power cycle. In this regard, the movable structure in the first configuration has a greater surface area normal to the flow of fluid than the movable structure in the second configuration.

In one example, the movable structure is connected to the generator assembly by a cable that allows movement of the movable structure away from the support structure during the power generation phase, and that allows movement of the movable structure back to the support structure during the recovery phase.

In one example, the body of fluid has a surface generally perpendicular to a first axis and parallel with second and third axes of a Cartesian coordinate system, and in which the fluid motion has one or more of a first-axis component, second-axis component or third-axis component. In this example, the support structure may include a swivel structure configured to permit movement of the movable structure with the second-axis component and third-axis component of the fluid motion. Additionally or alternatively, the support structure may include a pivotable guide structure configured to permit movement of the movable structure with the first-axis component of the fluid motion.

In one example, the movable structure includes a base and a canopy or a number of fins coupled to and extending from the base. The canopy/fins may each include a major surface and a minor surface, with the major surface having a greater surface area than the minor surface. In this example, the canopy/fins may each be arranged with its major surface facing a direction of fluid motion in the first configuration, and arranged with its minor surface facing the direction of fluid motion in the second configuration.

In a more particular example, the movable structure may include a canopy extending circumferentially around the base that is collapsible about the base reconfigure the movable structure from the first configuration to the second configuration. In another example, the movable structure may include a plurality of fins extending circumferentially around the base, and each fin may be rotatable about the base to reconfigure the movable structure between the first and second configurations.

In other aspects of examples, a method is provided for converting fluid motion into electrical power. The features, functions and advantages discussed herein may be achieved independently in various example embodiments or may be combined in yet other example embodiments further details of which may be seen with reference to the following description and drawings.

BRIEF DESCRIPTION OF THE DRAWING(S)

Having thus described example embodiments of the disclosure in general terms, reference will now be made to the accompanying drawings, which are not necessarily drawn to scale, and wherein:

FIG. 3 (including FIGS. 3a and 3b) illustrates a movable structure according to one example;

Figure 1B:
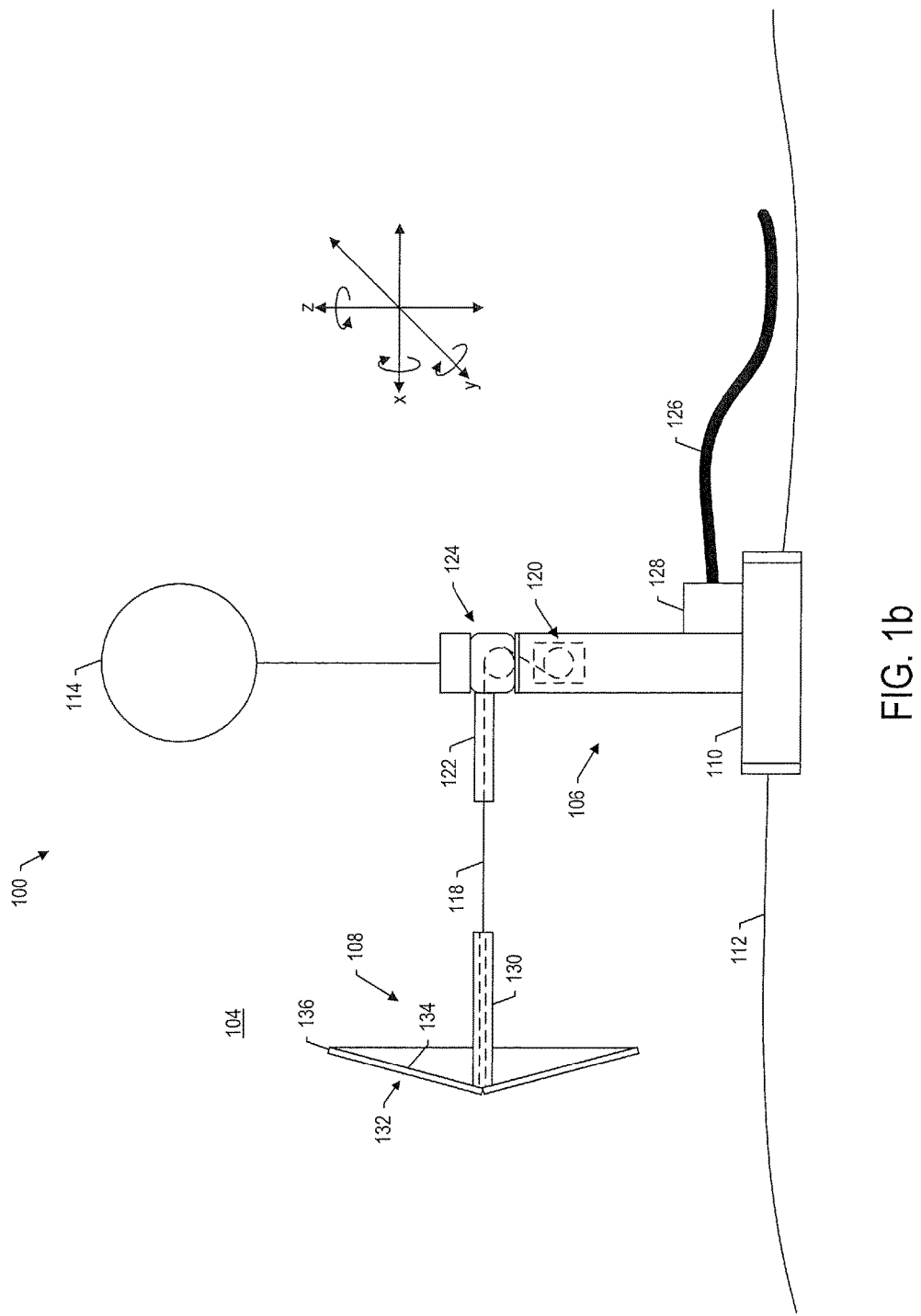
FIG. 1 (including FIGS. 1a and 1b) illustrates a cross-section of a system according to one example of the present disclosure.
Figure 7:
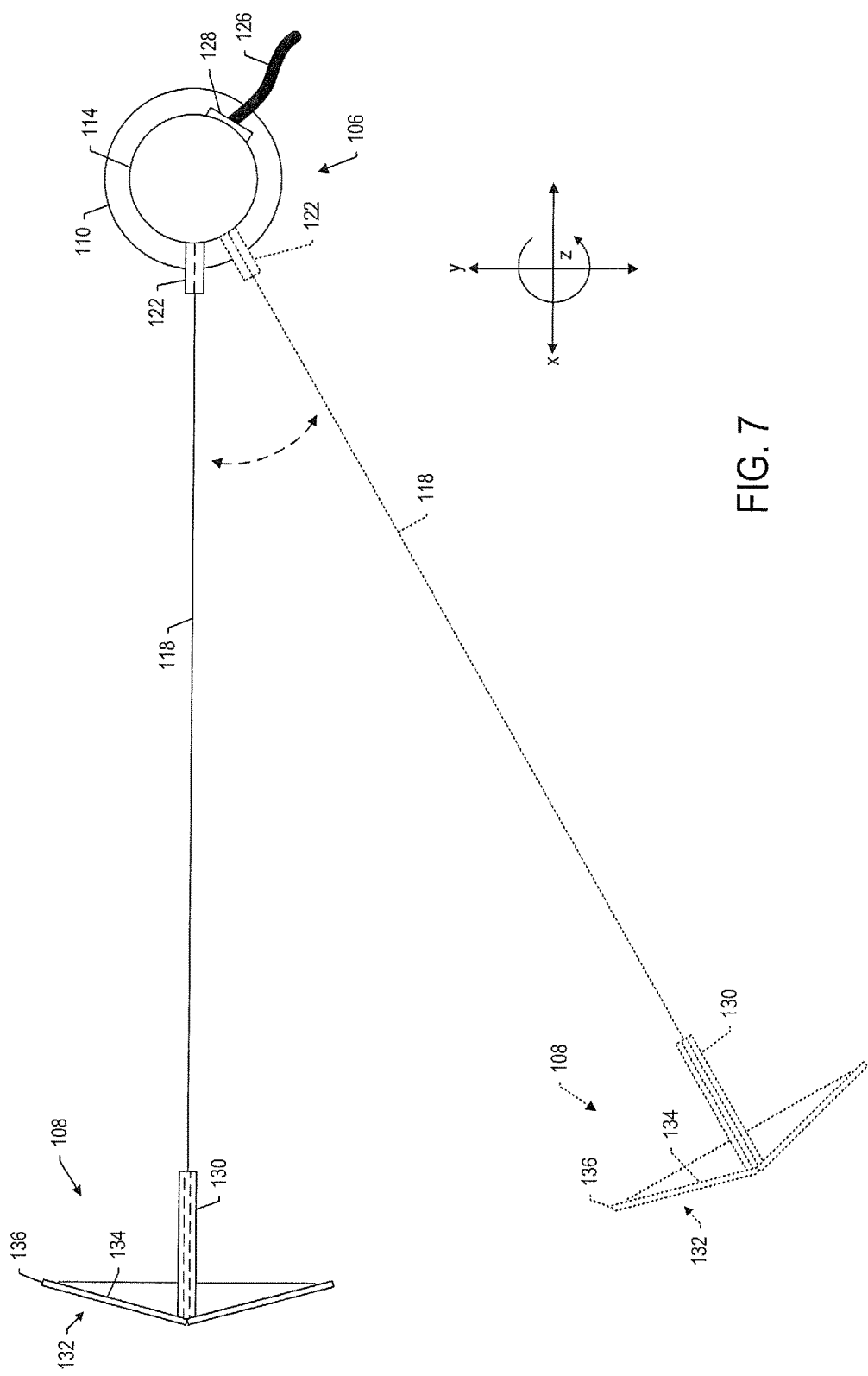
Figure 8:
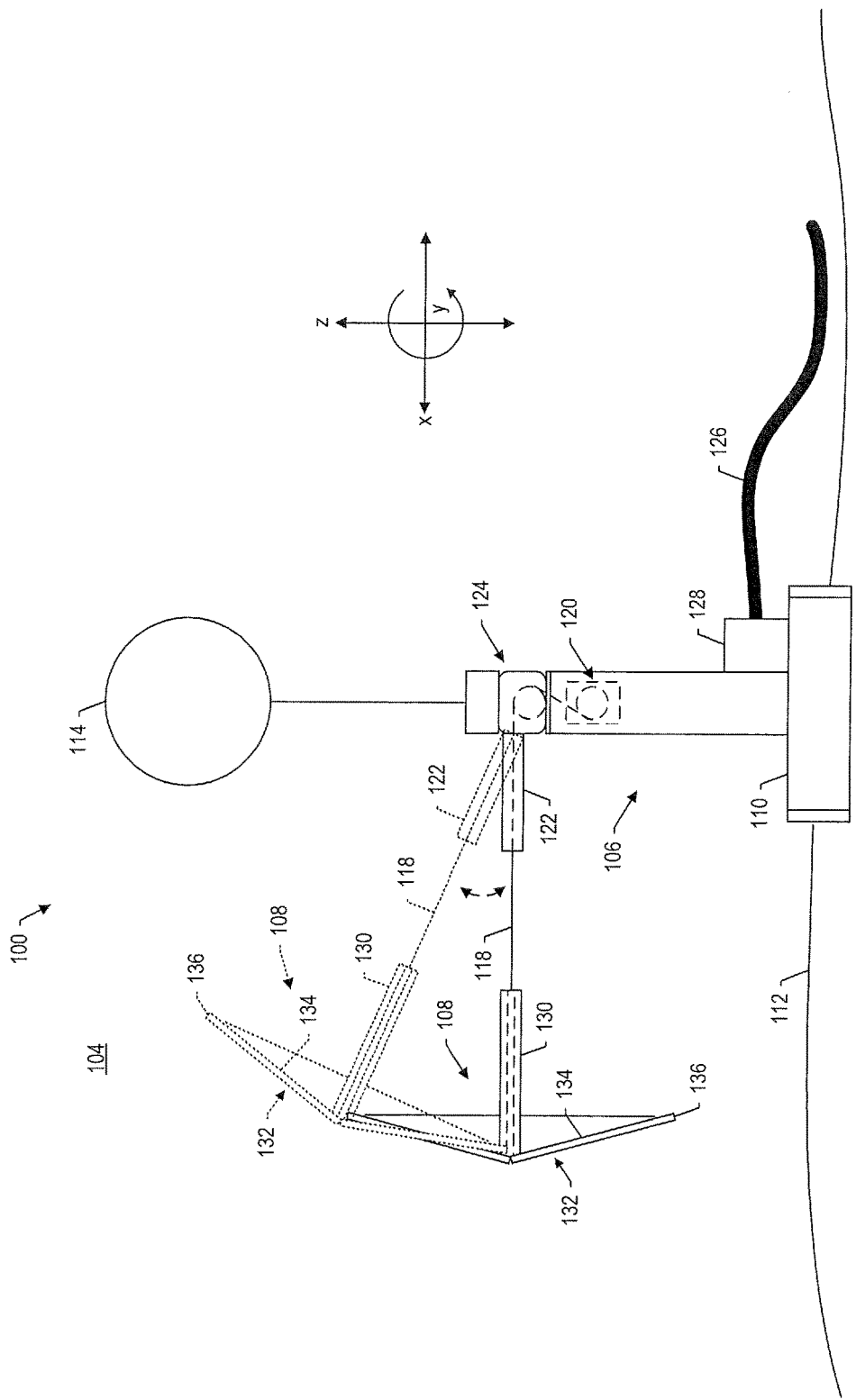
Figure 9:
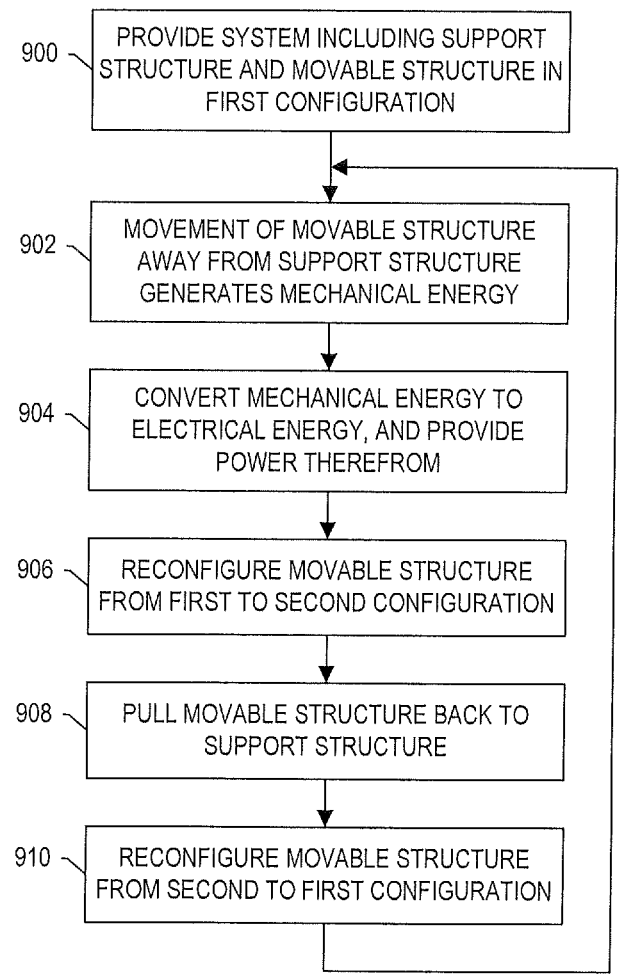

FIG. 5 (including FIGS. 5a, 5b, 5c and 5d) illustrates a top view of the system of FIG. 1 through various stages of a power cycle, according to one example;

FIG. 6 (including FIGS. 6a, 6b, 6c, 6d, 6e and 6f) illustrates a top view of a movable structure through various stages of a power cycle, according to one example;

FIGS. 7 and 8 illustrate degrees of freedom of the movable structure of one example; and FIG. 9 is a flowchart illustrating various steps in a method according to one example.

DETAILED DESCRIPTION

Some embodiments of the present disclosure will now be described more fully hereinafter with reference to the accompanying drawings, in which some, but not all variations of the disclosure are shown. Indeed, variations of the disclosure may be embodied in many different forms and should not be construed as limited to the examples set forth herein; rather, these are provided so that this disclosure will be thorough and complete, and will fully convey the scope of the disclosure to those skilled in the art. Examples may be described with reference to converting underwater current into electrical power, such as in the context of ocean, river or stream current. It should be understood, however, that examples may be equally applicable to the conversion of other fluid movement into electrical power. Like reference numerals refer to like elements throughout.

FIG. 1 illustrates a system 100 according to one example of the present disclosure. As shown, in one example, the system may be deployed underneath the surface 102 of a body of water 104 such as an ocean, river or stream. In this example, the system and its components may be sealed or otherwise constructed for underwater use. In other examples, the system may be deployed on or only partially beneath the surface of the body of water.

The system 100 may include a support structure 106 that may be fixed in position, and a movable structure 108 that may be movable relative to the support structure. In one example, the system may include an anchor 110 (e.g., suction anchor), mooring or the like for connecting the support structure to the bed 112 of the body of water. In another example, the system may be affixed to an underwater mooring structure such as a dam, ridge, canyon or the like. In yet another example, the system may be affixed to a watercraft such as a ship, boat, submarine or the like. And in one example in which the system is deployed underwater, the support structure may be tethered to a buoy 114 for holding the support structure upright underwater.

In one example, movable structure 108 may be neutrally or only slightly, positively buoyant, particularly for underwater deployments. For other deployments, for example, the movable structure may be positively buoyant. The movable structure may be secured to the support structure 106 by a cable 118 of a length sufficient to allow movement of the movable structure a certain distance from the support structure. The cable may in turn be attached to a generator assembly 120, which in one example, may be housed within the support structure.

In one example, the support structure 106 may include a guide structure 122 that extends outward from a swivel structure 124. The guide structure may maintain the movable structure a certain distance from the support structure and may guide the cable into and out of the support structure. Additionally, the guide structure and swivel structure may provide the movable structure with additional degrees of freedom. In one example, as explained in greater detail below, the movable structure may have three, four or more degrees of freedom. The additional degrees of freedom provided by the guide structure and swivel structure may permit the movable structure to move with current flow, which may not be always in the same direction.

The system 100 may be configured to operate over a plurality of power cycles each of which includes a power-generation phase and a recovery phase. During the power-generation phase, underwater current may act to push the movable structure 108 away from the support structure 106. This movement of the movable structure away from the support structure may generate mechanical energy, which may be transferred to the cable 118, and then from the cable to the generator assembly 120. The generator assembly may include a generator configured to convert this mechanical energy to electrical energy, and provide electric power from the electrical energy such as via a power cable 126 that may be attached to the support structure by an appropriate cable penetration 128. Then, when the movable structure has moved a certain distance from the support structure, the system may enter the recovery phase during which the movable structure may be drawn or pulled back to the support structure.

Figure 2:
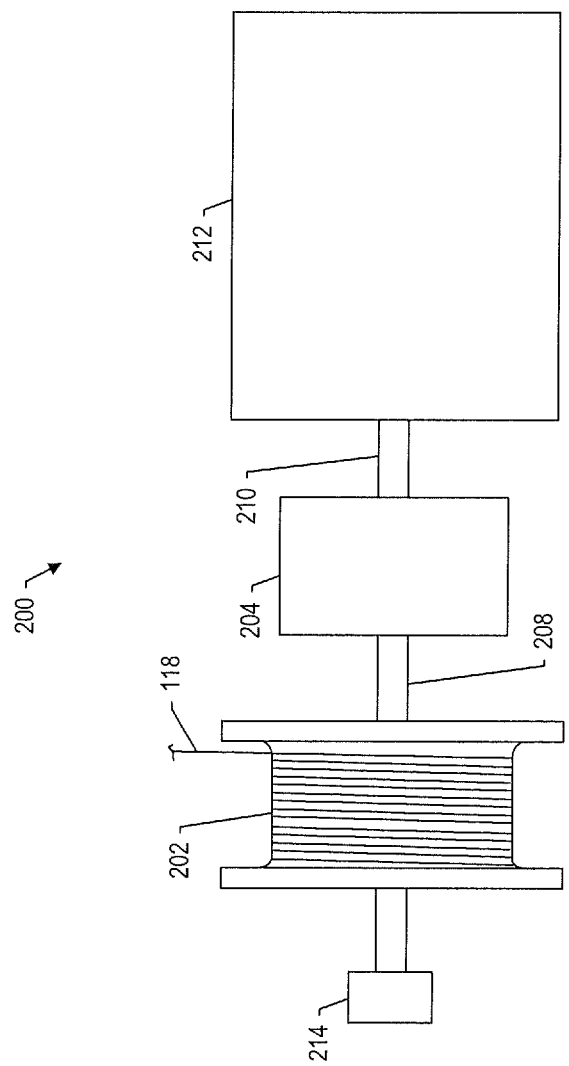
FIG. 2 illustrates a generator assembly according to one example.

The generator assembly 120 including its generator may be configured to convert mechanical energy to electrical energy in any of a number of different manners. FIG. 2 illustrates a generator assembly 200 that according to one example may correspond to generator assembly 120. As shown in FIG. 2, the generator assembly may include a spool 202 attached to the cable 118 to which the movable structure 108 is attached. The spool may be attached to a gear drive 204. A first shaft 208 may interconnect the spool and gear drive, and a second shaft 210 may interconnect the gear drive and a generator 212.

The cable 118 may be at least partially if not fully wound around the spool 202 at the beginning of the power generation phase of the power cycle. During the power generation phase, movement of the movable structure 108 causes the cable to unwind from the spool, which in turn causes the spool to rotate. A gear reduction system in the gear drive 204 causes the motion of the movable structure to spin the generator 212 at many times the rotation rate of the spool, enabling an efficient power generation speed for the generator. The effective gear ratio provided may be predetermined to optimize efficiency of the generator system and may range from 1:10 to as much as 1:1000 or more.

The spool 202 may be additionally attached to a recovery mechanism 214 configured to rewind the cable 118 around the spool during the recovery phase of the power cycle. In one example, the recovery mechanism may include an electric motor, which may receive power from that generated by the generator assembly 200, or from another source. In this instance, the power required to drive the motor may be less than the power generated by the generator assembly, with the difference being a net power generated by the system 100.

In another example, the recovery mechanism 214 may include a mechanical mechanism that may be configured to store and release mechanical energy, such as a spring or other oscillating device. In this regard, the mechanical mechanism may store mechanical energy as the cable is unwound during the power generation phase, and release the mechanical energy to rewind the cable during the recovery phase. In this instance, the mechanical energy stored/released by the mechanical mechanism may be less than that generated by the movement of the movable structure 108. The difference between the mechanical energy generated by the movable structure and stored/released by the mechanical mechanism may be a net mechanical energy for conversion to mechanical energy by the generator 212.

Returning to FIG. 1, the movable structure 108 may have any of a number of different configurations to facilitate its movement away from the support structure 106 during the power generation phase of the power cycle, and its movement back to the support structure during the recovery phase. In one example, the movable structure may have a first configuration during the power generation phase, and a second, different configuration during the recovery phase. Generally, the movable structure in the first configuration may have a greater surface area normal to the flow of underwater current than the movable structure in the second configuration.

In one example, the movable structure 108 may be an umbrella-like structure including a base 130 and a canopy 132 or a number of fins coupled to and extending from the base. Each of the canopy/fins includes one or more major surfaces 134 and one or more minor surfaces 136, with the major surface having a greater surface area than the minor surface. In one example, the canopy/fins may each include opposing major surfaces joined by opposing minor surfaces. During the power generation phase in which the movable structure moves away from the support structure 106, the movable structure may have a first configuration in which its canopy/fins are arranged with their major surface facing the direction of current flow. Then, during the recovery phase in which the movable structure moves back toward the support structure, the movable structure may have a second configuration in which its canopy/fins are arranged with their minor surface facing the direction of current flow.

FIG. 3 illustrates a movable structure 300 that according to one example embodiment may correspond to movable structure 108. As shown, the movable structure may include a base 302 and a canopy 304 extending continuously, circumferentially around the base. In one example, the canopy may include a flexible material such as a fabric supported by a frame or other support structures, which in one example may be interwoven into the flexible material. The canopy includes a major surface 306 and a minor surface 308, with the major surface having a greater surface area than the minor surface. As shown in FIG. 3a, during the power generation phase, the movable structure may have a first configuration in which the canopy is arranged with its major surface facing the direction of current flow. At the end of the power generation phase, the movable structure may reconfigure to a second configuration in which its canopy is arranged with its minor surface facing the direction of current flow. In one example, the canopy may be collapsible about the base in a manner similar to an umbrella, as shown in FIG. 3b. The movable structure may then have this second configuration during the recovery phase.

Figure 4B:
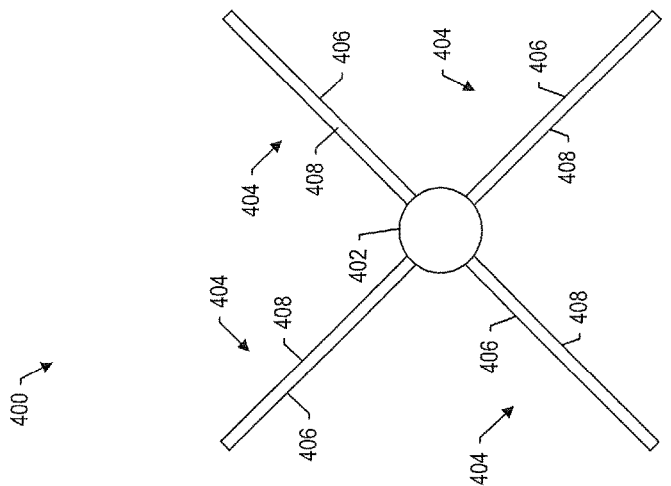
FIG. 4 (including FIGS. 4a and 4b) illustrates a movable structure according to another example.
Figure 4A:
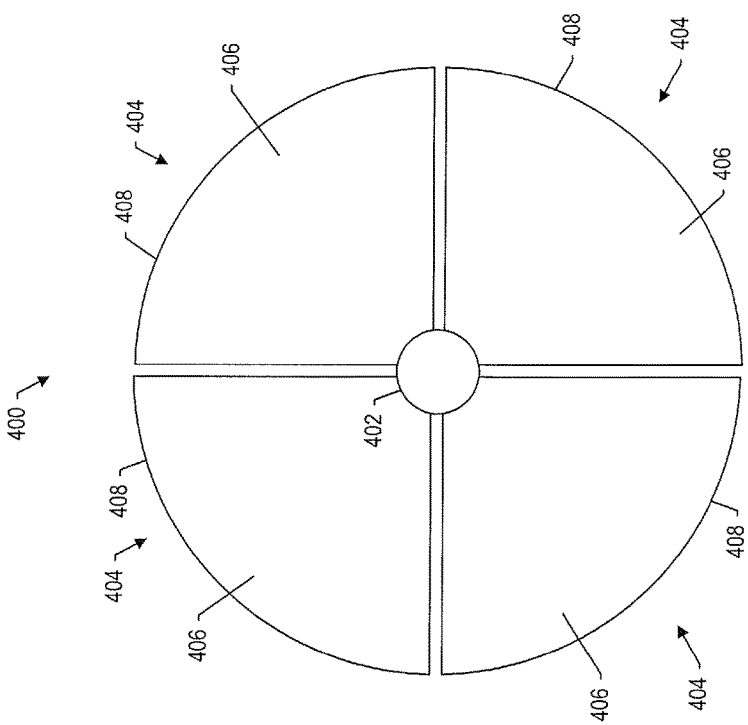
Figure 5A:
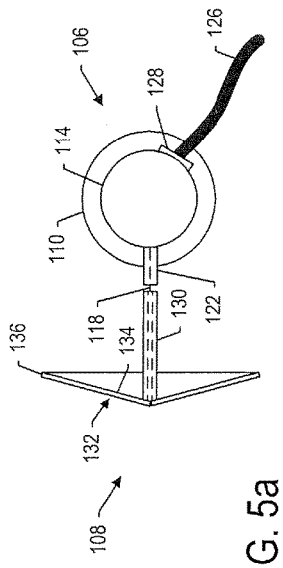
Figure 5B:
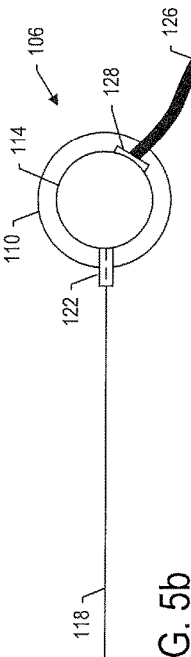
Figure 5C:
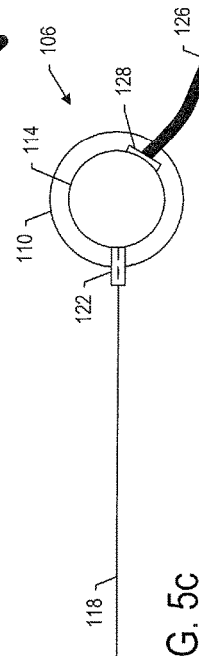
Figure 5D:
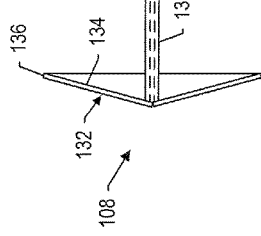

FIG. 4 illustrates a movable structure 400 that according to another example embodiment may correspond to movable structure 108. In one example, the movable structure may include a base 402 and a number of (one or more) fins 404 extending circumferentially around the base. Each of the fins includes a major surface 406 and a minor surface 408, with the major surface having a greater surface area than the minor surface. As shown in FIG. 4a, during the power generation phase in which the movable structure moves away from the support structure 106, the movable structure may have a first configuration in which its fins are arranged with their major surfaces facing the direction of current flow. At the end of the power generation phase, the movable structure may reconfigure to a second configuration in which its fins are arranged with their minor surfaces facing the direction of current flow. In one example, the fins may each rotate 90° relative to the base, as shown in FIG. 4b. In one example, the moveable structure may include an even number of fins that alternately rotate +90° and −90° relative to the base, which in various instances, may mitigate spin that may otherwise be caused by rotation of the fins. The fins may therefore be rotatable relative to the base to reconfigure the movable structure between the first and second configurations. The movable structure may then have this second configuration during the recovery phase in which the movable structure moves back toward the support structure.

FIG. 5 illustrates a top view of the system 100 through various stages of a power cycle. During the power generation phase, the movable structure 108 is in a first configuration with a greater surface area normal to the flow of underwater current as the movable structure moves away from the support structure 106, as shown in FIGS. 5a and 5b. The movable structure reconfigures to a second configuration with a lesser surface area normal to the flow of underwater current. The movable structure may then be pulled back to the support structure during the recovery phase, as shown in FIGS. 5c and 5d.

FIG. 6 illustrates a top view of the movable structure 108 through various stages of a power cycle. Again, the movable structure includes a canopy 132 or one or more fins extending from a base 130. As shown, in one example, the canopy may include first and second opposing major surfaces 134a, 134b joined by first and second opposing minor surfaces 136a, 136b. FIG. 6a illustrates the movable structure during the power generation phase in which the movable structure has a first configuration. In the first configuration, the canopy may be arranged with its first major surface 134a facing the direction of current flow (shown by the arrow). In this configuration, the first minor surface 136a may be extended out from the base by the first and second major surfaces, and the second minor surface 136b may be held against or proximate the base of the movable structure. The movable structure may include a latch to at least partially hold the movable structure in the first configuration. In one example, the movable structure may include a collar about its base that may slidably engage a latch on the base holding the canopy or rather its second minor surface in place.

Figure 6A:
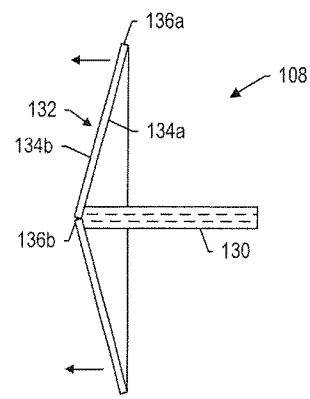
Figure 6B:
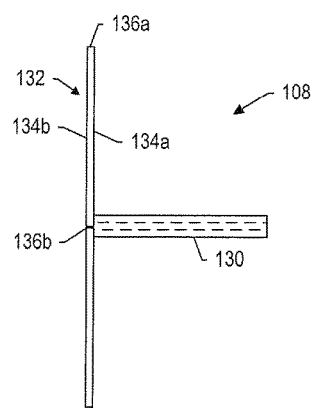
Figure 6C:
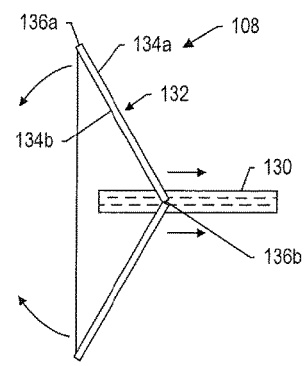
Figure 6D:
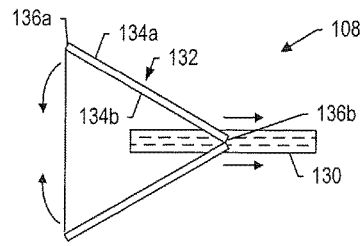
Figure 6E:
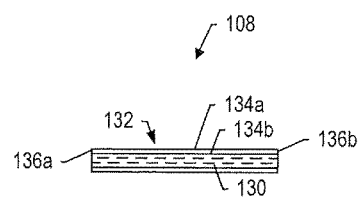

At or toward the end of the power generation phase, the movable structure 108 may be engaged to reconfigure itself from the first configuration to a second configuration for the recovery phase of the power cycle. In one example, current flow may move the collar to engage the latch at the base 130 of the movable structure to free the second minor surface 136b of the canopy 132. As shown in FIGS. 6b and 6c, continued current flow may push the first minor surface 136a in the direction of current flow and then downward toward the base, which may appear similar to turning an umbrella inside out. As also shown in FIG. 6c and further in FIG. 6d, the second minor surface may slidably engage the base, and may move along the base opposite the direction of current flow as the first minor surface moves downward toward the base. This movement may continue until the canopy lies approximately against the base, at which point the movable structure is in the second configuration, and the second minor surface of its canopy faces the direction of current flow, as shown in FIG. 6e. In one example, at this point, the first minor surface may be latched against or proximate the base of the movable structure, similar to the second minor surface before.

Figure 6F:
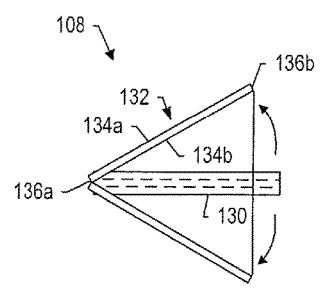

Reconfiguration of the movable structure 108 may occur at the end of the power generation phase, beginning of the recovery phase, or between or across the power generation and recovery phases. At the end of the recovery phase, the movable structure may again reconfigure itself from the second configuration to the first configuration. In one example, the guide structure 122 of the support structure 106 may include an angled surface. As the movable structure is pulled in toward the support structure, the movable structure may engage the guide structure and its angled surface may at least partially wedge between the canopy 132 and base 130. This may cause the second minor surface 136 of the canopy to begin to pivot out and away from the base, as shown in FIG. 6f. The direction of current flow, then, may push the canopy outward and back to the first configuration (see FIG. 6a). This reconfiguration may occur at the end of the recovery phase, beginning of the power generation phase, or between or across the recovery and power generation phases. The power cycle may then begin again.

As explained above, in one example, the movable structure 106 may have three, four or more degrees of freedom. Reference is again made to FIG. 1, and now more particularly to FIGS. 7 and 8. Consider for example the Cartesian coordinate system shown in FIGS. 1, 7 and 8. As shown, the system includes a z-axis generally perpendicular to the surface 102 of the body of water 104, and x- and y-axes generally parallel to the surface. Current flow in the body of water may generally have either or both of an x-axis component or y-axis component. But in various instances, current may flow upward or downward toward or away from the surface, with current flow thereby adding a z-axis component.

The movable structure 108 may be rotatable about its base 130 and linearly movable away from or toward the support structure 106. In one example, the swivel structure 124 of the support structure may additionally permit movement of the movable structure about the z-axis, as shown in FIG. 7. These three-degrees of freedom may permit the movable structure to move with an x-axis component and y-axis component of current flow. Additionally or alternatively, as shown in FIG. 8, the guide structure 122 of the support structure may be a pivotable guide structure, which may permit movement of the movable structure about the y-axis. This additional degree of freedom may permit the movable structure to move with a z-axis component of current flow. The movable structure may therefore have additional degrees of freedom that may permit the movable structure to move with current flow, which may not always be in the same direction.

In one example, the system 100 may be deployable as a pre-fabricated module for easy set up and use, such as for remote operations or supplemental power to extend missions. In another example, the system may be employed in groups as a "farm" with associated power cables 126 collectively feeding power to a storage or transmission system. And in yet another example, the system may be employed in a forward operating base (FOB) or other installation or facility that may require power. In any instance, the system may provide a smaller footprint than current water-based energy production systems, and may do so with more environmental advantages, less moving/rotating parts, complexity, noise reduction and the like.

Reference is now made to FIG. 9, which illustrates a flowchart illustrating various steps in a method for converting fluid motion into electrical power, according to one example embodiment. As shown in block 900, the method includes deploying in a body of fluid (e.g., body of water 104), a system 100 including a support structure 106 connected to a movable structure 108, or otherwise providing such a system deployed in a body of fluid. In one example in which the method includes deploying the system, the system may be deployed underneath a surface (e.g., surface 102) of the body of fluid. In this example, the system may further include a buoy 114 to which the support structure is tethered, with the buoy being configured to hold the support structure upright when deployed.

The method includes generating mechanical energy by the movable structure 108 in reaction to fluid motion acting on the movable structure during a power generation phase of a power cycle, with the movable structure having three or more degrees of freedom. In one example, generating the mechanical energy includes movement of the movable structure away from the support structure 106, as shown in block 902, with the movable structure being connected to the support structure by a cable 118 that allows the respective movement.

The method also includes converting the mechanical energy to electrical energy and providing electric power from the electrical energy, as shown in block 904.

The method may further include reconfiguring the movable structure 108 from a first configuration and to a second, different configuration for a recovery phase of the power cycle, as shown in block 906. In this regard, the movable structure in the first configuration having a greater surface area normal to the flow of fluid than the movable structure in the second configuration. In one example, then, the method may include pulling the movable structure back to the support structure 106 by the cable during the recovery phase, as shown in block 908. The movable structure may be again reconfigured from the second configuration back to the first configuration, as shown in block 910. And another power cycle may begin anew with movement of the movable structure away from the support structure.

In one example, the body of fluid has a surface generally perpendicular to a first axis and parallel with second and third axes of a Cartesian coordinate system, and in which the fluid motion has one or more of a first-axis component, second-axis component or third-axis component. In this example, generating the mechanical energy may include movement of the movable structure 108 with the second-axis component and third-axis component of the fluid motion, and away from the support structure 106. Additionally or alternatively, for example, generating the mechanical energy may include movement of the movable structure with the first-axis component of the fluid motion.

In one example, the movable structure 108 includes a base 130 and a canopy 132 or one or more fins coupled to and extending from the base. In this example, the canopy includes a major surface 134 and a minor surface 136, with the major surface having a greater surface area than the minor surface. The canopy may be arranged with its major surface facing a direction of fluid motion in the first configuration. Reconfiguring the movable structure, then, may include reconfiguring the canopy such that its minor surface faces the direction of fluid motion in the second configuration.

In a more particular example, the movable structure 300 includes a canopy 304 that extends circumferentially around the base 302, and reconfiguring the canopy includes collapsing the canopy about the base (see FIG. 3). In another example, the movable structure 400 includes a plurality of fins 404 extending circumferentially around the base 402, and reconfiguring the fin includes rotating each fin about the base (see FIG. 4).

Many modifications and other embodiments of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for converting fluid motion into electrical power, the system being deployable in a body of fluid and comprising:
    a support structure including a generator assembly configured to convert mechanical energy to electrical energy and provide electric power from the electrical energy; and
    a movable structure connected to the support structure and including a canopy coupled to and extending from a base, the canopy including first and second opposing major surfaces joined by first and second opposing minor surfaces, the movable structure being configured to generate mechanical energy for conversion by the generator assembly during a power generation phase of a power cycle in which the fluid motion acts on the movable structure, the movable structure having three or more degrees of freedom,
    wherein the movable structure has a first configuration during the power generation phase in which the canopy is arranged with the first major surface facing a direction of fluid motion, the first minor surface extending out from the base by the first and second major surfaces, and the second minor surface held against or proximate the base,
    wherein the movable structure is reconfigurable from the first configuration to a second, different configuration for a recovery phase of the power cycle in which the movable structure has a lesser surface area normal to the flow of fluid than the movable structure in the first configuration,
    wherein reconfiguration of the movable structure includes the first minor surface being caused by the fluid motion to move in the direction of fluid motion and then downward toward the base, and the second minor surface being caused to move along the base opposite the direction of fluid motion, until the canopy lies approximately against the base, at which point the movable structure is in the second configuration,
    wherein the body of fluid has a surface generally perpendicular to a first axis and parallel with second and third axes of a Cartesian coordinate system, and in which the fluid motion has one or more of a first-axis component, second-axis component or third-axis component, and
    wherein the support structure includes a swivel structure configured to swivel relative to the support structure and thereby permit movement of the movable structure with the second-axis component and third-axis component of the fluid motion, the swivel structure being configured to swivel with the direction of fluid motion and independent of movement of the movable structure away from the support structure.

2. The system of claim 1, wherein the movable structure is connected to the generator assembly by a cable that allows movement of the movable structure away from the support structure during the power generation phase, and that allows movement of the movable structure back to the support structure during the recovery phase.

3. The system of claim 1, wherein the support structure further includes a pivotable guide structure configured to pivot and thereby permit movement of the movable structure with the first-axis component of the fluid motion.

4. The system of claim 1, wherein the system is deployable underneath a surface of the body of fluid, the system further comprising:
    a buoy to which the support structure is tethered, the buoy being configured to hold the support structure upright when deployed.

5. The system of claim 2, wherein the generator assembly includes a spool around which the cable is unwound and wound during respectively the power generation phase and recovery phase, the spool being rotatable about an axis coplanar with the second-axis component and third-axis component of the fluid motion.

6. A method for converting fluid motion into electrical power comprising:
    providing a system including movable structure connected to a support structure that includes a swivel structure, the movable structure including a canopy coupled to and extending from a base, the canopy including first and second opposing major surfaces joined by first and second opposing minor surfaces, the system being deployed in a body of fluid;
    generating mechanical energy by the movable structure in reaction to fluid motion acting on the movable structure during a power generation phase of a power cycle, the movable structure having three or more degrees of freedom;
    converting the mechanical energy to electrical energy and providing electric power from the electrical energy; and
    reconfiguring the movable structure from a first configuration in which the canopy is arranged with the first major surface facing a direction of fluid motion, the first minor surface extending out from the base by the first and second major surfaces, and the second minor surface held against or proximate the base, the movable structure being reconfigured from the first configuration to a second, different configuration for a recovery phase of the power cycle in which the movable structure has a lesser surface area normal to the flow of fluid than the movable structure in the first configuration, wherein reconfiguring the movable structure includes the fluid motion causing the first minor surface to move in the direction of fluid motion and then downward toward the base, and the second minor surface being caused to move along the base opposite the direction of fluid motion, until the canopy lies approximately against the base, at which point the movable structure is in the second configuration, wherein the body of fluid has a surface generally perpendicular to a first axis and parallel with second and third axes of a Cartesian coordinate system, and in which the fluid motion has one or more of a first-axis component, second-axis component or third-axis, and wherein generating the mechanical energy includes swiveling of the swivel structure relative to the support structure and thereby movement of the movable structure with the second-axis component and third-axis component of the fluid motion, and movement away from the support structure, the swivel structure swiveling with the direction of fluid motion and independent of movement of the movable structure away from the support structure.

7. The method of claim 6, wherein generating the mechanical energy includes movement of the movable structure away from the support structure, the movable structure being connected to the support structure by a cable that allows the respective movement.

8. The method of claim 7 further comprising pulling the movable structure back to the support structure by the cable during the recovery phase.

9. The method of claim 6, wherein the support structure further includes a pivotable guide structure, and wherein generating the mechanical energy further includes pivoting of the pivotable guide structure and thereby movement of the movable structure with the first-axis component of the fluid motion.

10. The method of claim 6 further comprising:

deploying the system underneath a surface of the body of fluid, the system further including a buoy to which the support structure is tethered, the buoy being configured to hold the support structure upright when deployed.

* * * * *